(12) United States Patent
Lan (10) Patent No.: US 6,830,254 B2
(45) Date of Patent: Dec. 14, 2004

(54) STROLLER WITH AN ADJUSTABLE BACKREST

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 171 days.

(21) Appl. No.: 10/356,534

(22) Filed: Feb. 3, 2003

(65) Prior Publication Data

US 2004/0150174 A1 Aug. 5, 2004

(51) Int. Cl.$^7$ ................................................ B62B 7/00
(52) U.S. Cl. ................... 280/47.4; 280/642; 280/47.41; 297/354.12
(58) Field of Search ........................... 280/47.4, 47.38, 280/642, 643, 647, 650, 658; 297/354.12, 366, 367, 368, 369

(56) References Cited

U.S. PATENT DOCUMENTS

| | | | | |
|---|---|---|---|---|
| 4,805,928 A | * | 2/1989 | Nakao et al. ............... 280/642 |
| 5,240,265 A | * | 8/1993 | Huang ........................ 280/47.4 |
| 5,622,377 A | * | 4/1997 | Shamie ........................ 280/642 |
| 5,669,625 A | * | 9/1997 | Jane Cabagnero .......... 280/647 |
| 5,687,985 A | * | 11/1997 | Sack ........................... 280/650 |
| 5,806,877 A | * | 9/1998 | Huang ........................ 280/642 |
| 5,833,261 A | * | 11/1998 | Brown et al. ............... 280/642 |
| 6,322,097 B1 | * | 11/2001 | Lan ............................ 280/642 |
| 6,361,056 B1 | * | 3/2002 | Chen et al. ................ 280/47.4 |

* cited by examiner

Primary Examiner—Hau Phan
(74) Attorney, Agent, or Firm—Baker Botts L.L.P.

(57) ABSTRACT

A stroller includes a seat frame, a backrest with a supporting frame pivoted to the seat frame, and a positioning unit including a positioning seat formed with a first engaging member, a second engaging member mounted movably on the supporting frame and movable between engaging and disengaging positions, and an urging member for urging the second engaging member to move to the engaging position. The second engaging member presses downwardly against the first engaging member by urging action of the urging member.

6 Claims, 12 Drawing Sheets

STROLLER WITH AN ADJUSTABLE BACKREST

BACKGROUND OF THE INVENTION

1. Field of the Invention

This invention relates to a stroller, more particularly to a stroller with an adjustable backrest.

2. Description of the Related Art

Figure 1:
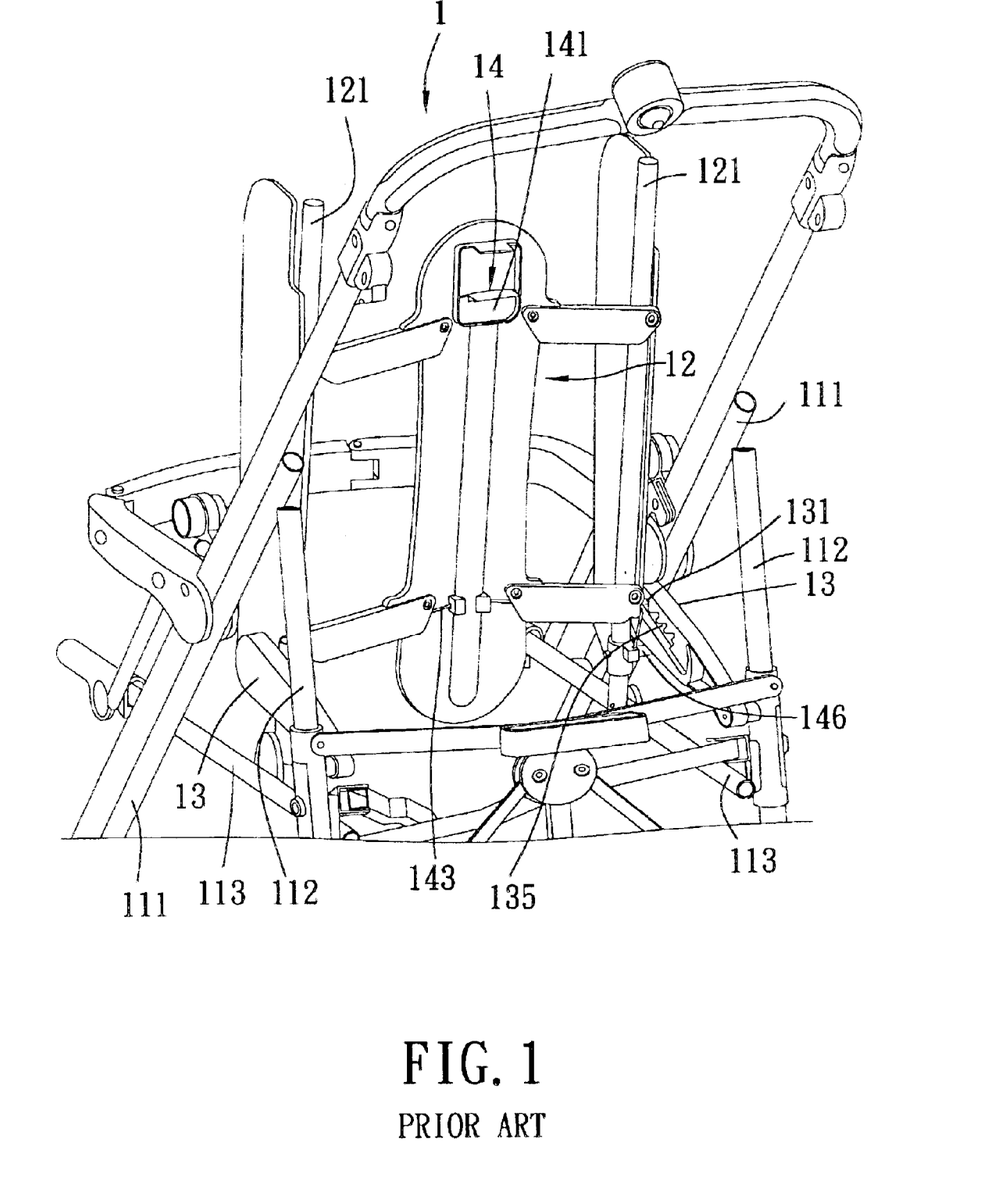
FIG. 1 is a fragmentary perspective view of a conventional stroller.
Figure 2:
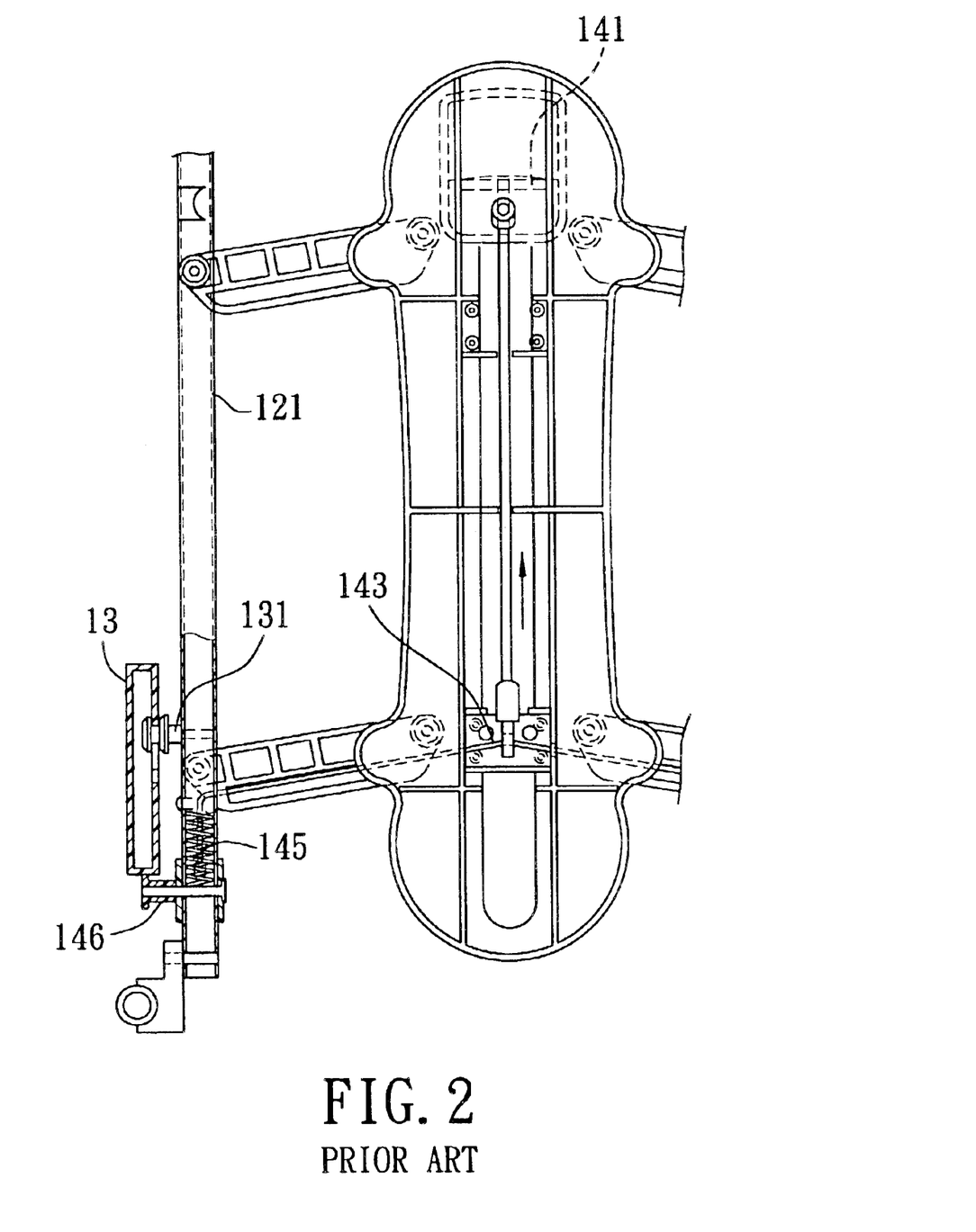
FIG. 2 is a fragmentary front view of a backrest and a positioning unit of the conventional stroller of FIG. 1.
Figure 3:
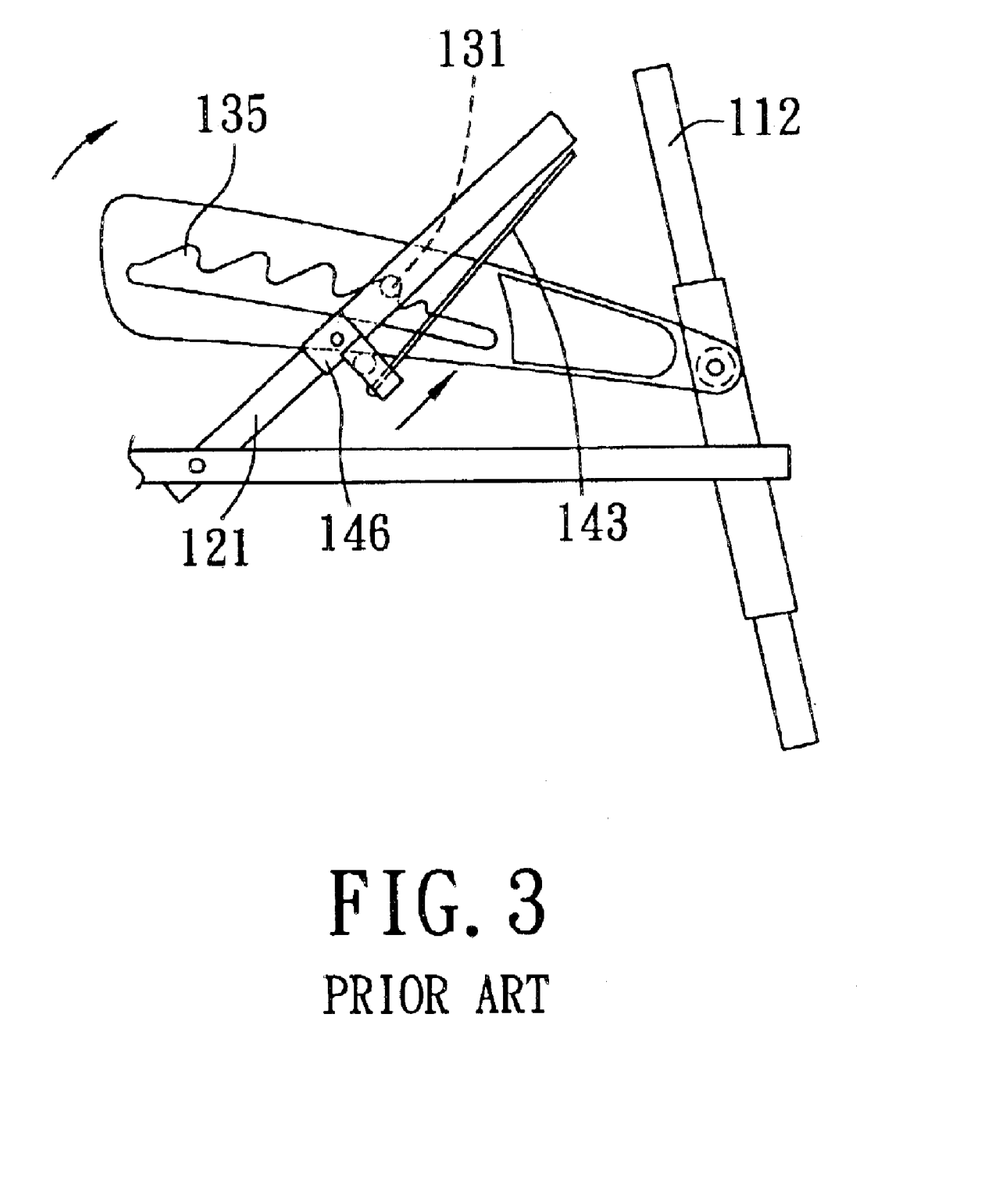
FIG. 3 is a fragmentary side view to illustrate how the positioning unit of FIG. 2 is moved from an engaging position to a disengaging position.
Figure 4:
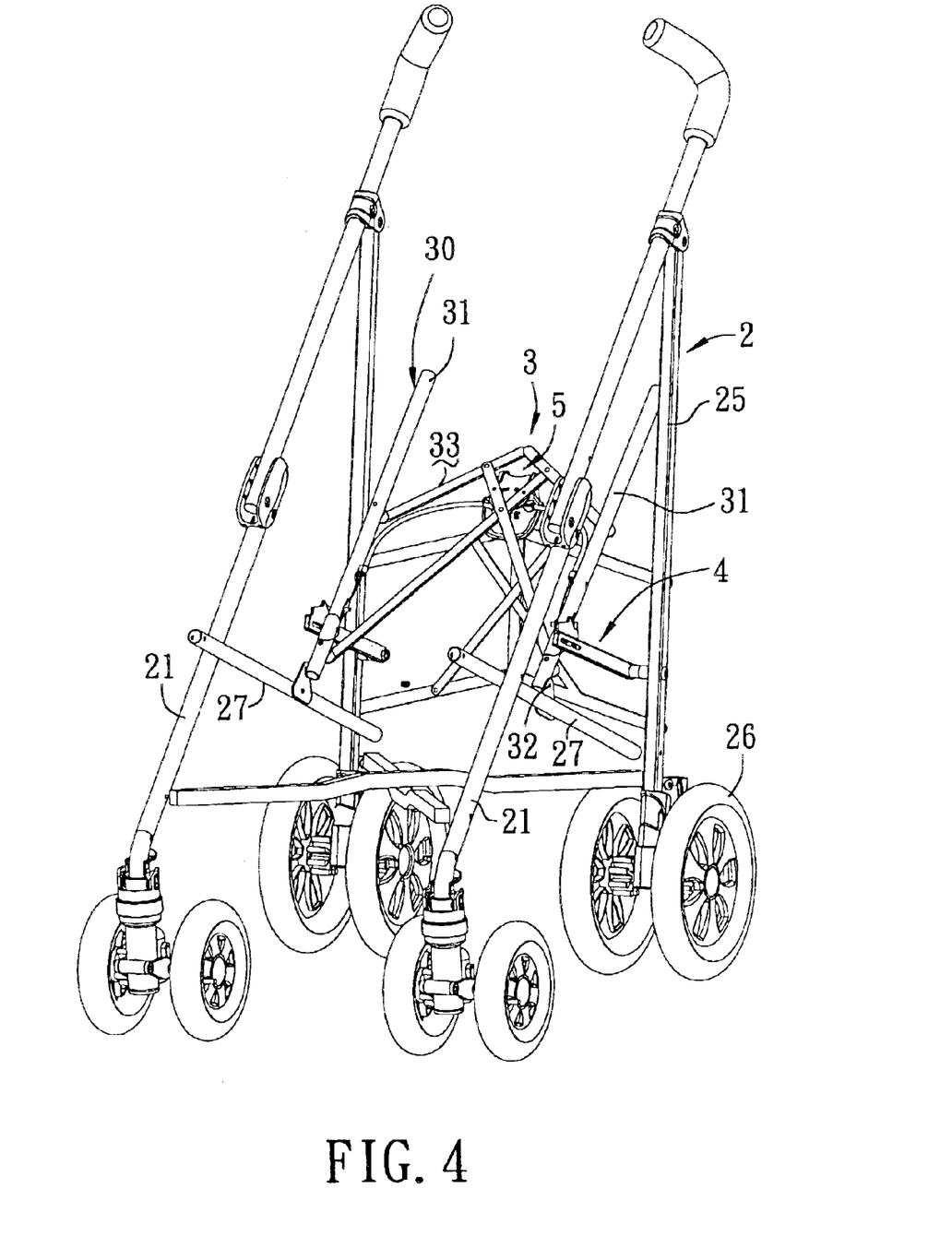
FIG. 4 is a perspective view of a stroller embodying this invention.
Figure 5:
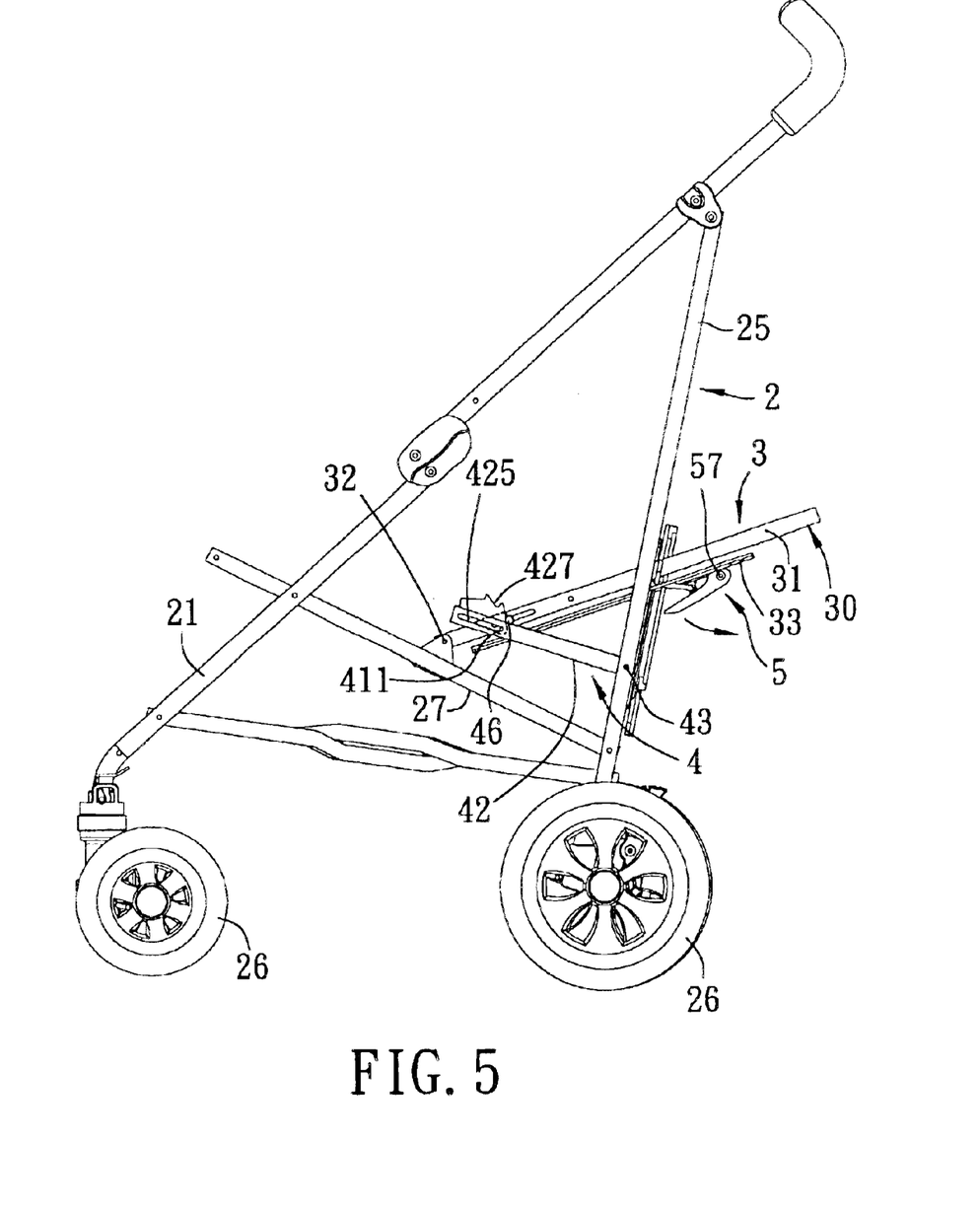
FIG. 5 is a side view of the stroller of FIG. 4.

FIGS. 1 to 3 illustrate a conventional stroller 1 that includes a leg unit with front and rear legs 111, 112, a seat frame 113 pivoted to the front and rear legs 111, 112, a backrest 12 with left and right supporting rods 121 pivoted to the seat frame 113, and a positioning unit. The positioning unit includes a pair of engaging pins 131 and a pair of positioning seats 13, each of which is pivoted to a respective one of the rear legs 112, and each of which is formed with a plurality of engaging grooves 135. Each of the engaging pins 131 projects from a respective one of the left and right supporting rods 121 to engage releasably a selected one of the engaging grooves 135 in a respective one of the positioning seats 13. Each of the positioning seats 13 is rotatable upwardly and downwardly between an engaging position, in which the respective engaging pin 131 engages the selected one of the engaging grooves 135, and a disengaging position, in which the respective engaging pin 131 disengages from the selected one of the engaging grooves 135. A releasing member 14 includes a pair of pushing members 146, each of which is mounted slidably on a respective one of the left and right supporting rods 121, and each of which-contacts a bottom side of a respective one of the positioning seats 13, a pair of urging members 145, each of which is mounted in a respective one of the left and right supporting rods 121 above a respective one of the pushing members 146 and each of which is connected to the respective one of the pushing members 146, and a handle 141 with a string 143 connected to the pushing members 146 in such a manner that pulling of the handle 141 results in upward movement of the pushing members 146 against urging action of the urging members 145, which, in turn, results in upward movement of the positioning seats 13 to the disengaging position, thereby permitting adjustment of the backrest 12 to a desired position. Each positioning seat 13 is restored to the engaging position by virtue of gravity upon being released from the pulling action of the handle 141.

The conventional stroller 1 is disadvantageous in that, since each positioning seat 13 is simply laid on the respective engaging pin 131 at the engaging position by gravity, the same tends to disengage undesirably from the respective engaging pin 131. Moreover, a longer travelling distance of the handle 141 and a greater pulling force are required to adjust the position of the backrest 12 when the latter is disposed at a lower position.

SUMMARY OF THE INVENTION

Therefore, the object of the present invention is to provide a stroller that is capable of overcoming the aforementioned drawbacks of the prior art.

According to the present invention, a stroller comprises: a leg unit; a seat frame mounted on the leg unit; a backrest including a supporting frame that is pivoted to the seat frame so as to permit rotation of the supporting frame about a first axis; and a positioning unit including an elongated positioning seat with a rear end pivoted to the leg unit so as to permit rotation of the positioning seat about a second axis that is parallel to the first axis, and a front end section opposite to the rear end and connected movably to the supporting frame. The positioning unit further includes a first engaging member formed on the positioning seat, a second engaging member mounted movably on the supporting frame and disposed above the first engaging member, and an urging member. The second engaging member is movable upwardly and downwardly on the supporting frame between an engaging position, in which the second engaging member engages the first engaging member, and a disengaging position, in which the second engaging member disengages from the first engaging member. The urging member urges the second engaging member to press downwardly against the first engaging member when the second engaging member is positioned at the engaging position.

BRIEF DESCRIPTION OF THE DRAWINGS

In drawings which illustrate an embodiment of the invention.

DETAILED DESCRIPTION OF THE PREFERRED EMBODIMENT

FIGS. 4 to 11 illustrate a stroller embodying this invention. The stroller includes: a leg unit 2 with front and rear legs 21, 25 and a plurality of wheels 26; a seat frame 27 mounted pivotally on the front and rear legs 21, 25 of the leg unit 2; a backrest 3 including a supporting frame 30 that is pivoted to the seat frame 27 so as to permit rotation of the supporting frame 30 about a first axis; and a positioning unit 4 including an elongated positioning seat 42 with a rear end pivoted to the leg unit 2 so as to permit rotation of the positioning seat 42 about a second axis that is parallel to the first axis, and a front end section opposite to the rear end and connected movably to the supporting frame 30. The positioning unit 4 further includes a first engaging member 61 (see FIG. 7) formed on the positioning seat 42, a second engaging member 62 mounted movably on the supporting frame 30 and disposed above the first engaging member 61, and an urging member 63 (see FIG. 8). The second engaging member 62 is movable upwardly and downwardly on the supporting frame 30 between an engaging position (indicated in solid lines in FIG. 12), in which the second engaging member 62 engages the first engaging member 61, and a disengaging position (indicated in broken lines in FIG. 12), in which the second engaging member 62 disengages from the first engaging member 61. The urging member 63 urges the second engaging member 62 to press downwardly against the first engaging member 61 when the second engaging member 62 is positioned at the engaging position.

Figure 6:
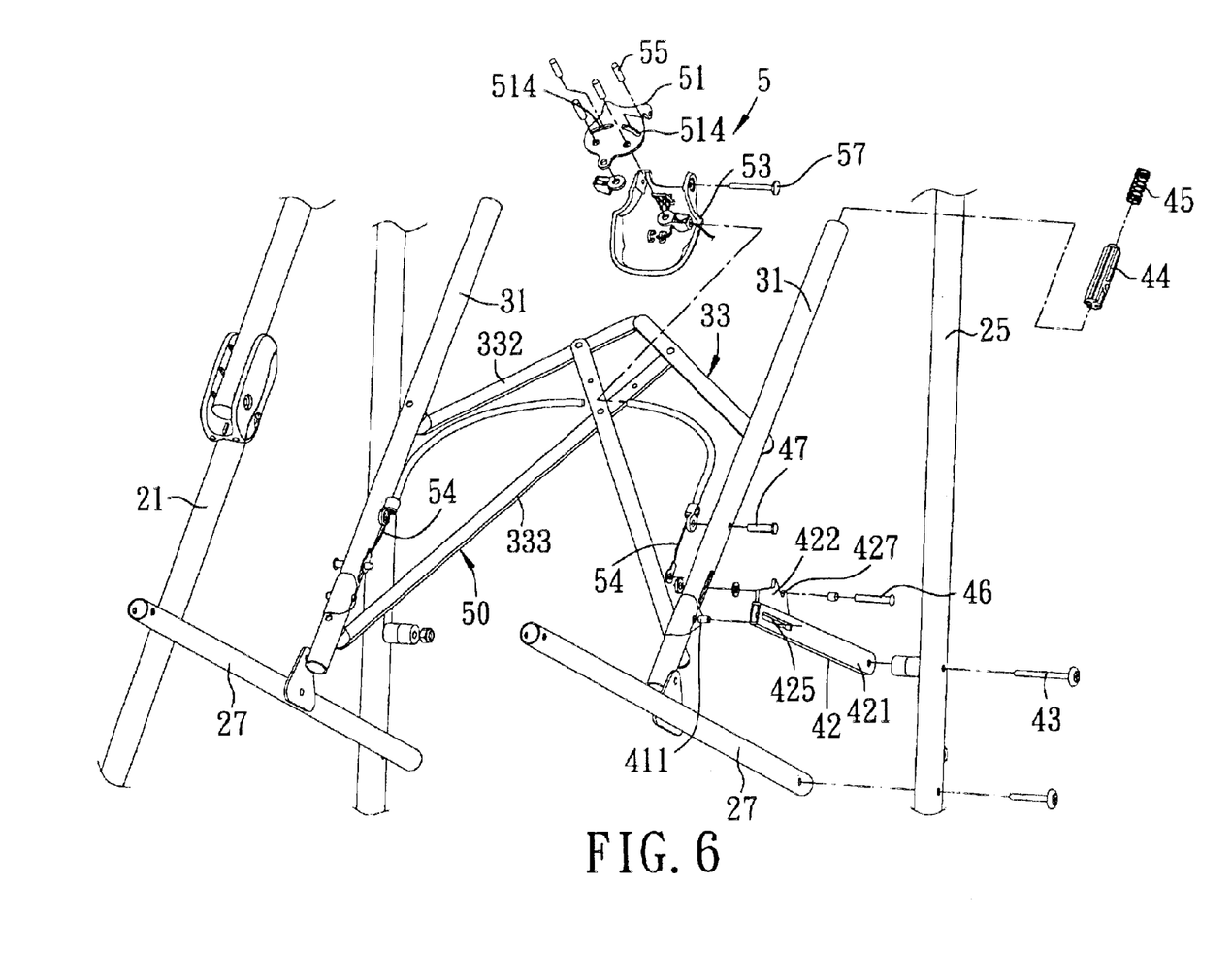
FIG. 6 is a fragmentary partly exploded perspective view of the stroller of FIG. 4.

The positioning seat 42 includes elongated left and right seat rods 421, each of which has a rear end pivoted to a respective one of the rear legs 25 of the leg unit 2 through a pivot pin 43, and a front end section that is formed with an elongated first slot 425. The supporting frame 30 includes a pair of hollow left and right supporting rods 31, each of which is pivoted to the seat frame 27 through a pivot pin 32 and extends upwardly therefrom. The positioning unit 4 further includes a pair of connecting pins 411, each of which projects from a respective one of the left and right supporting rods 31 and into the first slot 425 in the front end section of a respective one of the left and right seat rods 421 so as to permit simultaneous rotation of the supporting frame 30 about the first axis and rotation of the positioning seat 42 about the second axis in order to adjust position of the backrest 3 with respect to the seat frame 27.

Figure 7:
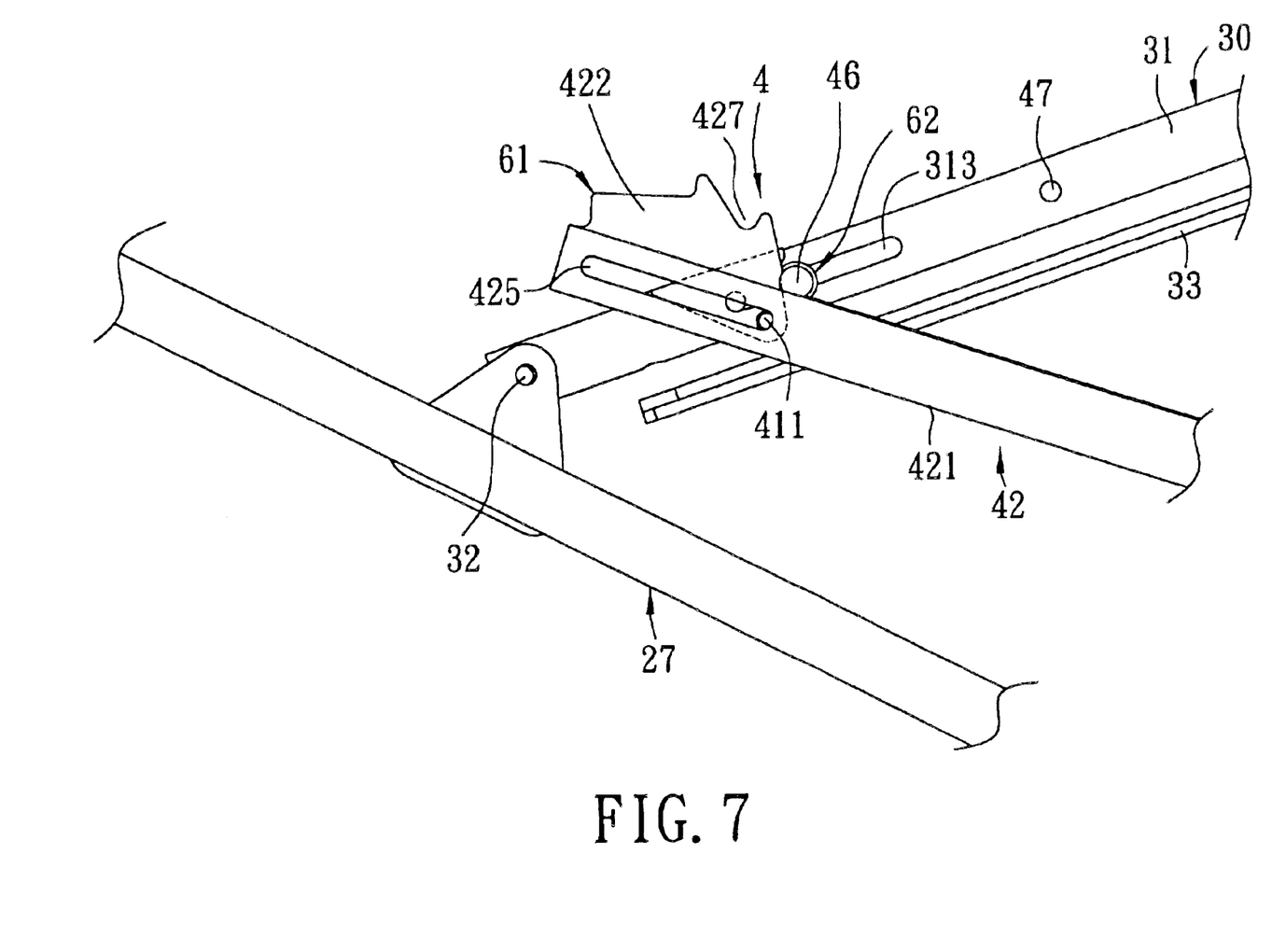
FIG. 7 is a fragmentary side view to illustrate how a positioning unit functions to position a backrest of the stroller of FIG. 4.

The first engaging member 61 includes a pair of engaging plates 422, each of which is mounted on a respective one of the left and right seat rods 421 and each of which is formed with a plurality of engaging grooves 427. The second engaging member 62 includes a pair of engaging pins 46, each of which projects from a respective one of the left and right supporting rods 31 to engage a selected one of the engaging grooves 427 and to press downwardly against a respective one of the engaging plates 422 by urging action of the urging member 63 when the second engaging member 62 is positioned at the engaging position.

Figure 8:
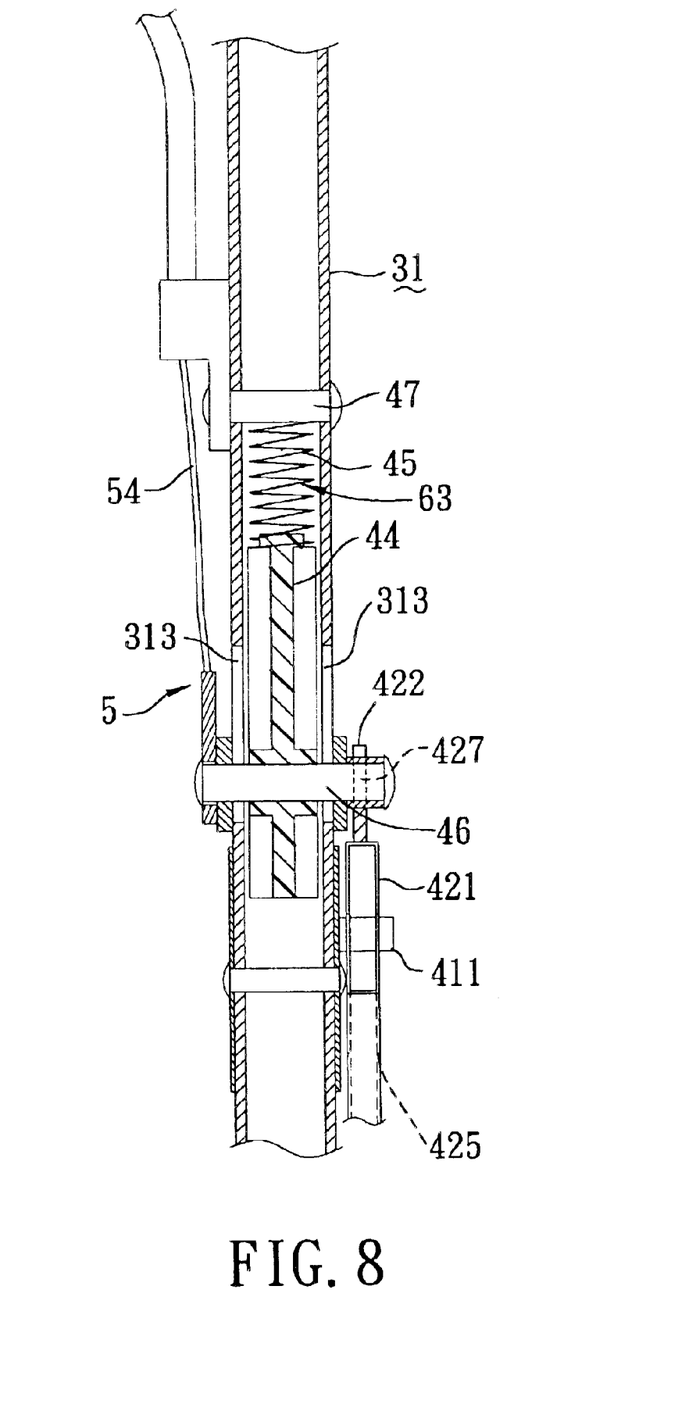
FIGS. 8 and 9 are fragmentary sectional views to illustrate how a releasing member functions to permit release of the backrest from the positioning unit of FIG. 7.
Figure 9:
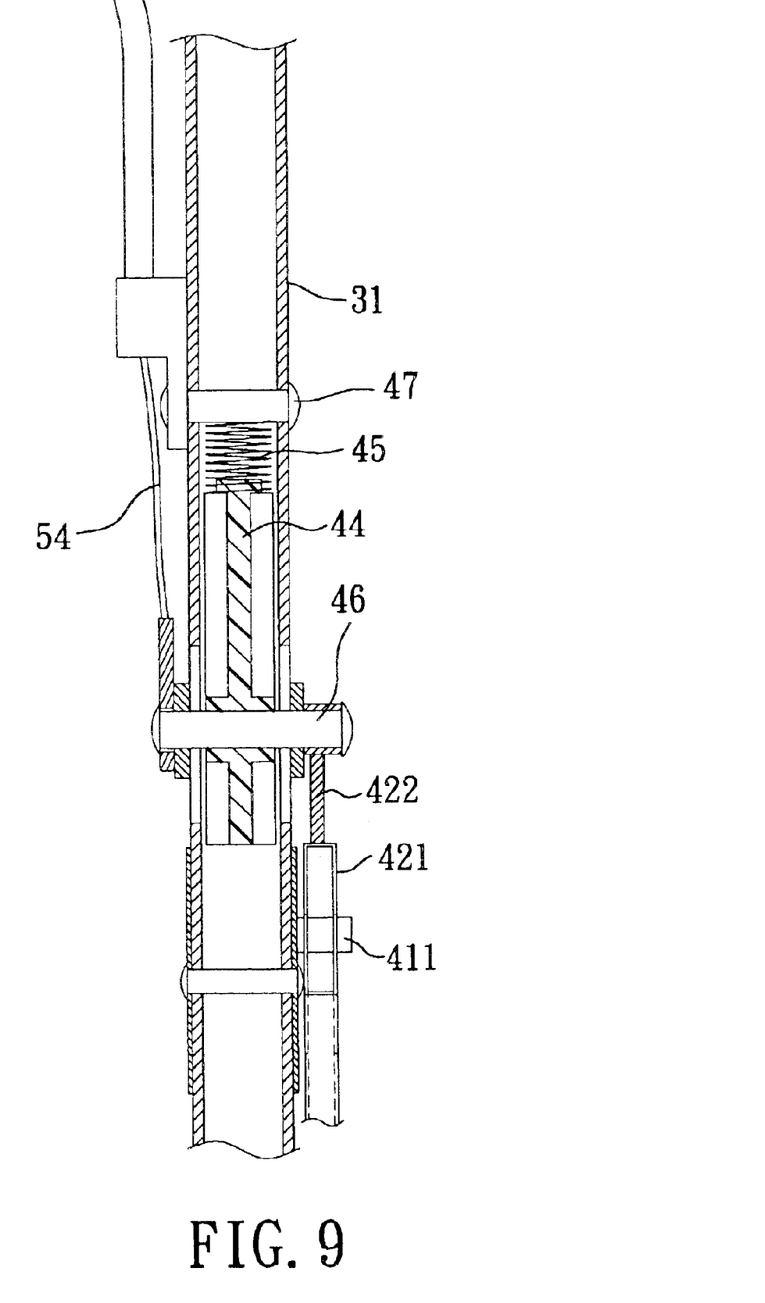
Figure 10:
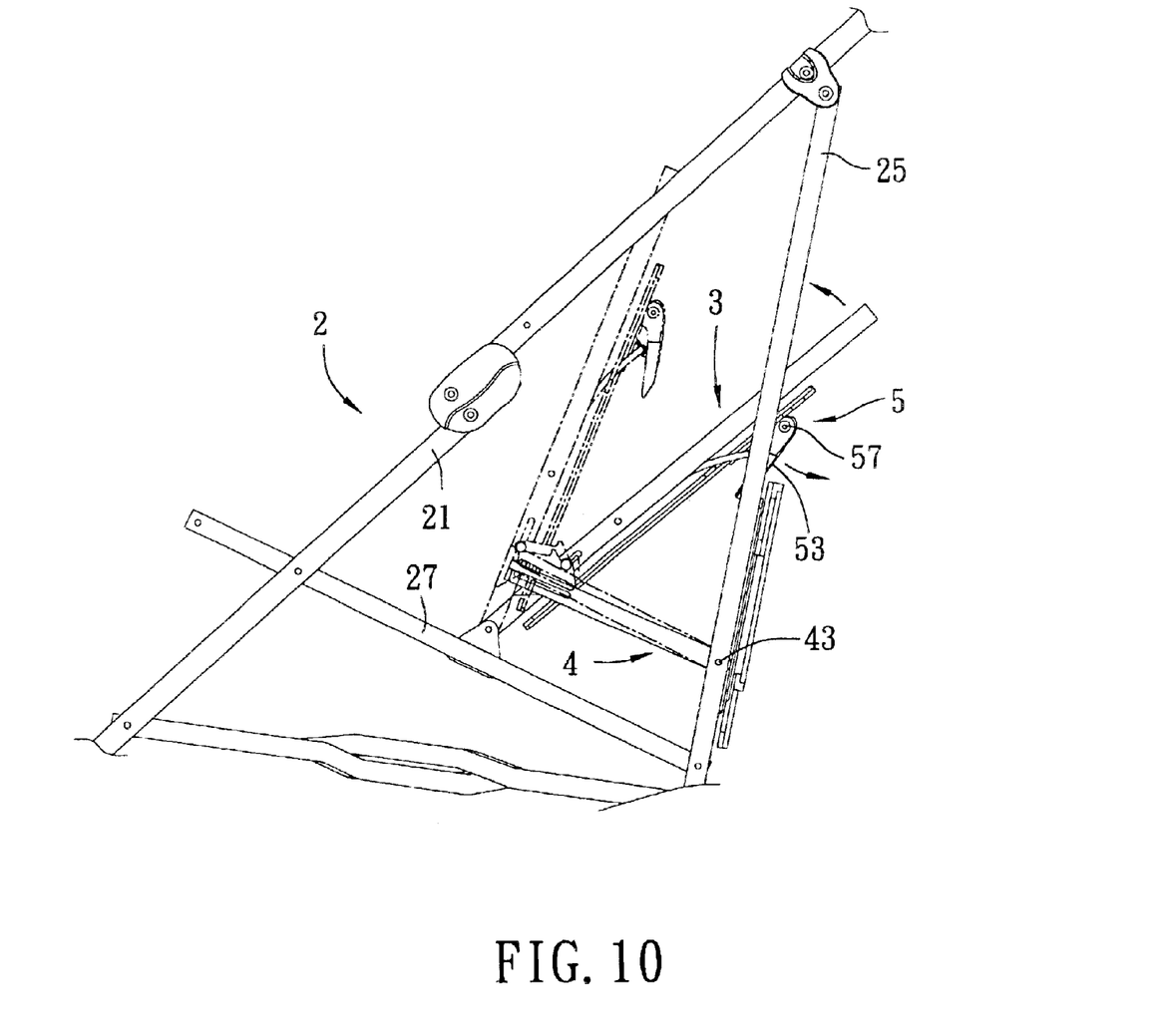
FIG. 10 is a fragmentary side view to illustrate how the backrest is adjusted to a desired position relative to a seat frame of the stroller of FIG. 4.

Each of the left and right supporting rods 31 is formed with an elongated second slot 313. Each of the engaging pins 46 extends respectively through the second slots 313 in the left and right supporting rods 31. The urging member 63 includes a pair of coil springs 45, each of which is mounted in a respective one of the left and right supporting rods 31 above the engaging pins 46, and each of which is fixed to the respective one of the left and right supporting rods 31 through a fastening pin 47. A releasing member 5 includes a pair of connecting blocks 44, each of which is mounted movably in a respective one of the left and right supporting rods 31 between a respective one of the engaging pins 46 and a respective one of the coil springs 45, each of which is connected to the respective one of the engaging pins 46, and each of which abuts against the respective one of the coil springs 45. The releasing member 5 further includes a string 54 that is connected to the engaging pins 46 and that is operable to pull upwardly the engaging pins 46 against urging action of the coil springs 45 so as to permit upward movement of the second engaging member 62 to the disengaging position.

Figure 11:
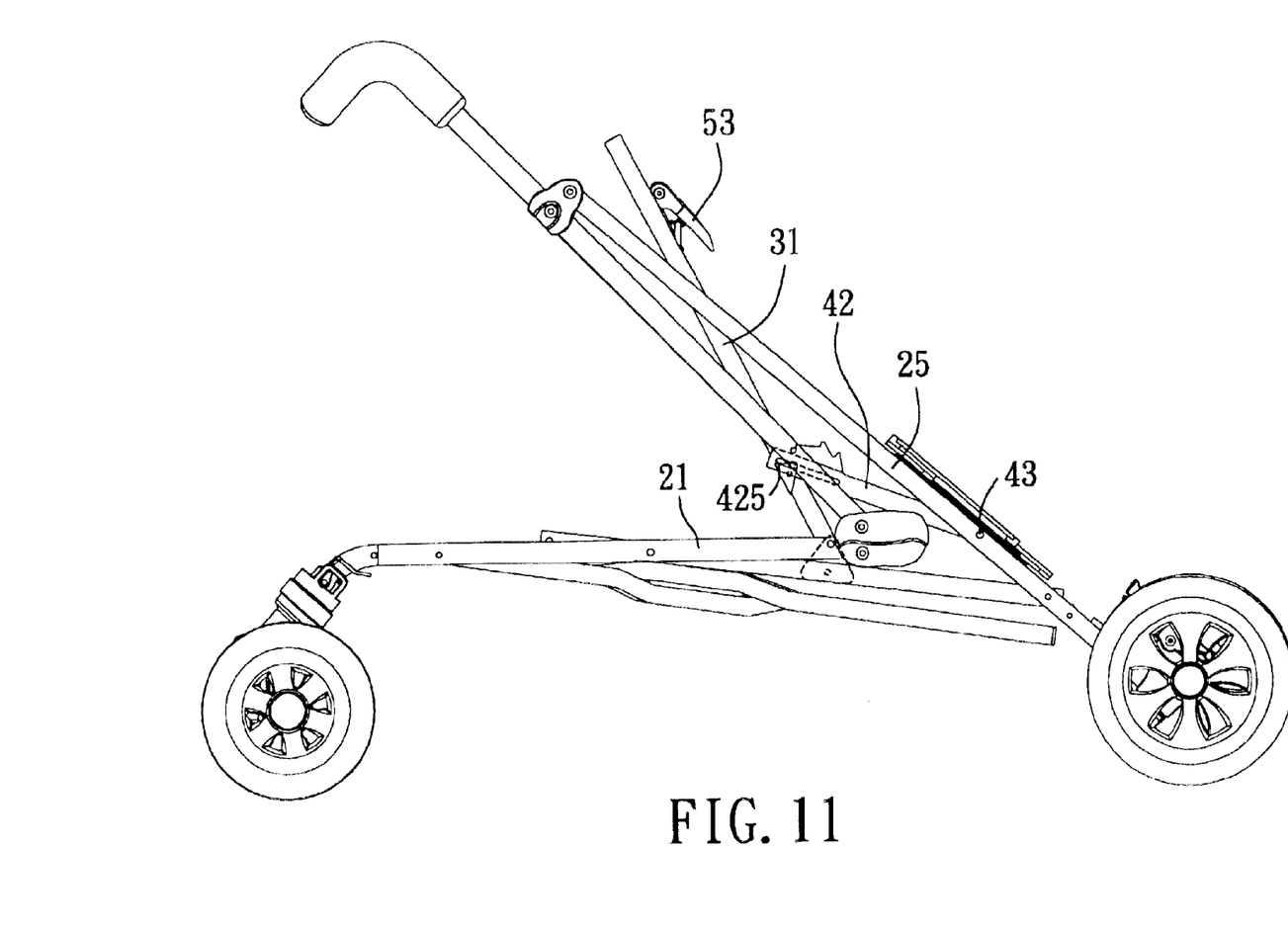
FIG. 11 is a side view of the stroller of FIG. 4 in a folded state.
Figure 12:
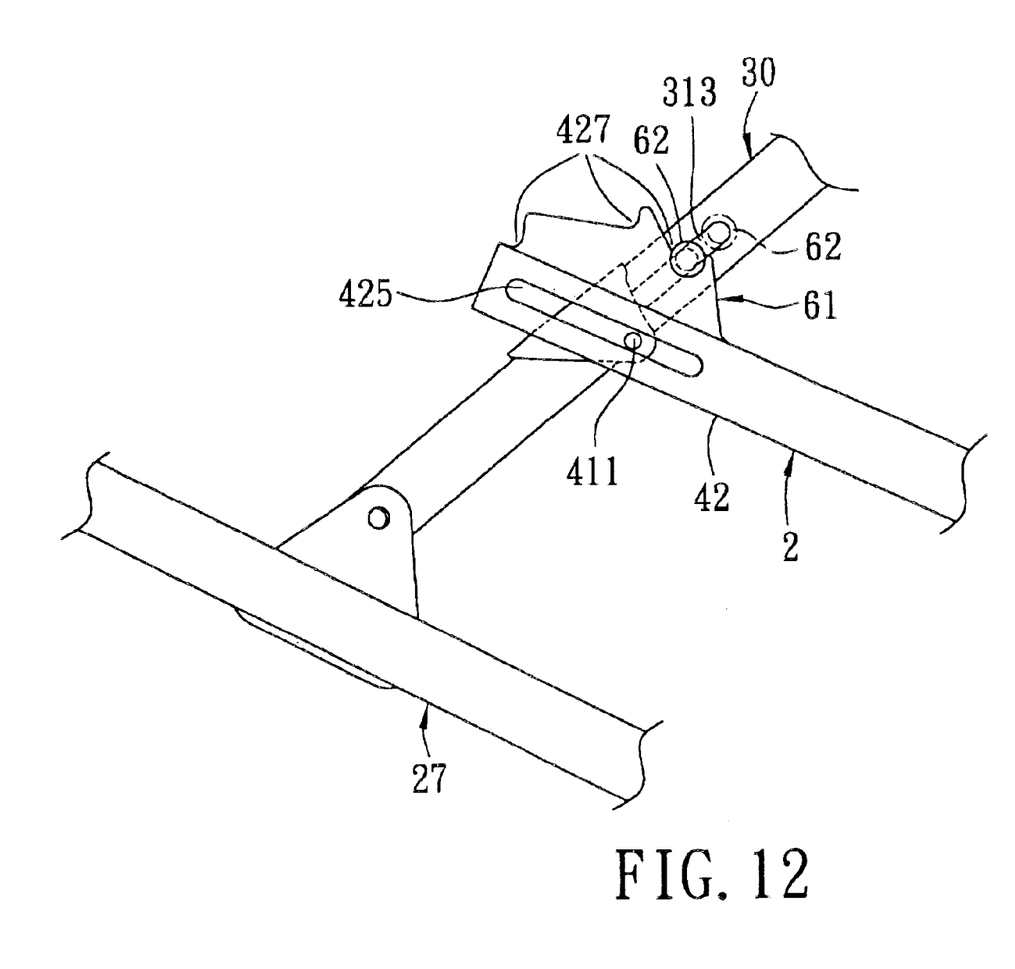
FIG. 12 is a fragmentary side view to illustrate how an engaging member of the positioning unit of FIG. 7 is moved between engaging and disengaging positions.

The backrest 3 further includes a linkage unit 33 that extends between and that is pivoted to the left and right supporting rods 31 and that includes a pair of pivoted first links 332 and a pair of pivoted second links 333 which are respectively pivoted to the first links 332 so as to permit folding of the backrest 3 (see FIG. 11).

A bracket 51 is formed with a pair of arcuate slots 514, and is mounted on a back side of the linkage unit 33 (see FIG. 6) through a pair of positioning pins 55 that extend from the linkage unit 33 through the arcuate slots 514 so as to permit folding of the linkage unit 33. An operating lever 53 is pivoted to the bracket 51 through a pivot pin 57 so as to be rotatable about a third axis which is parallel to the first and second axes, and is connected to the string 54 in such a manner that rotation of the operating lever 53 in a direction away from the bracket 51 results in upward pulling of the second engaging member 62 to the disengaging position.

Since the first engaging member 61 is pressed by the second engaging member 62 by urging action of the urging member 63, the aforesaid tendency of undesired disengagement between the first and second engaging members can be eliminated. Moreover, arrangement of the first and second engaging members 61, 62 and the positioning seat 42 is capable of eliminating the aforesaid drawbacks with respective to the longer travelling distance and the greater pulling force required by the conventional stroller.

With the invention thus explained, it is apparent that various modifications and variations can be made without departing from the spirit of the present invention. It is therefore intended that the invention be limited only as recited in the appended claims.

I claim:

1. A stroller comprising:

a leg unit;

a seat frame mounted on said leg unit;

a backrest including a supporting frame that is pivoted to said seat frame so as to permit rotation of said supporting frame about a first axis; and a positioning unit including an elongated positioning seat with a rear end pivoted to said leg unit so as to permit rotation of said positioning seat about a second axis that is parallel to said first axis, and a front end section opposite to said rear end and said front end section connected movably to said supporting frame, said positioning unit further including a first engaging member formed on said positioning seat, a second engaging member mounted movably on said supporting frame and disposed above said first engaging member, and an urging member, said second engaging member being movable upwardly and downwardly on said supporting frame between an engaging position, in which said second engaging member engages said first engaging member, and a disengaging position, in which said second engaging member disengages from said first engaging member, said urging member urging said second engaging member to press downwardly against said first engaging member when said second engaging member is positioned at said engaging position.

2. The stroller of claim 1, wherein said positioning seat includes elongated left and right seat rods, each of which has a rear end pivoted to said leg unit, and a front end section that is formed with an elongated first slot, said supporting frame including a pair of hollow left and right supporting rods, each of which is pivoted to said seat frame and extends upwardly therefrom, said positioning unit further including a pair of connecting pins, each of which projects from a respective one of said left and right supporting rods and into said first slot in said front end section of a respective one of said left and right seat rods so as to permit simultaneous rotation of said supporting frame about said first axis and rotation of said positioning seat about said second axis in order to adjust position of said backrest with respect to said seat frame.

3. The stroller of claim 2, wherein said first engaging member includes a pair of engaging plates, each of which is mounted on a respective one of said left and right seat rods and each of which is formed with a plurality of engaging grooves, said second engaging member including a pair of engaging pins, each of which projects from a respective one of said left and right supporting rods to engage a selected one of said engaging grooves and to press downwardly against a respective one of said engaging plates by urging action of said urging member when said second engaging member is positioned at said engaging position.

4. The stroller of claim 3, wherein each of said left and right supporting rods is formed with an elongated second slot, each of said engaging pins extending respectively through said second slots in said left and right supporting rods, said urging member including a pair of coil springs that are respectively mounted in said left and right supporting rods above said engaging pins, said stroller further comprising a releasing member that includes a pair of connecting blocks, each of which is mounted movably in a respective one of said left and right supporting rods between a respective one of said engaging pins and a respective one of said coil springs, each of which is connected to the respective one of said engaging pins, and each of which abuts against the respective one of said coil springs, said releasing member further including a string that is connected to said engaging pins and that is operable to pull upwardly said engaging pins against urging action of said coil springs so as to permit upward movement of said second engaging member to said disengaging position.

5. The stroller of claim 4, wherein said backrest further includes a linkage unit that extends between and that is pivoted to said left and right supporting rods and that includes a pair of pivoted first links and a pair of pivoted second links which are respectively pivoted to said first links so as to permit folding of said backrest.

6. The stroller of claim 5, further comprising a bracket mounted on said linkage unit, and an operating lever that is pivoted to said bracket so as to be rotatable about a third axis which is parallel to said first and second axes, and that is connected to said string in such a manner that rotation of said operating lever in a direction away from said bracket results in upward pulling of said second engaging member to said disengaging position.

* * * * *